(12) United States Patent
Kondou

(10) Patent No.: US 8,408,276 B2
(45) Date of Patent: Apr. 2, 2013

(54) ORGANO-MODIFIED SILICONE, MOLD RELEASE AGENT FOR MOLD CASTING COMPRISING THE SAME, AND MOLD CASTING METHOD USING THE SAME

(75) Inventor: Takahiro Kondou, Fukui (JP)

(73) Assignee: Nicca Chemical Co., Ltd., Fukui-shi, Fukui (JP)

( * ) Notice: Subject to any disclaimer, the term of this patent is extended or adjusted under 35 U.S.C. 154(b) by 0 days.

(21) Appl. No.: 13/326,816

(22) Filed: Dec. 15, 2011

(65) Prior Publication Data

US 2012/0152479 A1 Jun. 21, 2012

(30) Foreign Application Priority Data

Dec. 17, 2010 (JP) .................. 2010-282428

(51) Int. Cl.
*B22C 3/00* (2006.01)
(52) U.S. Cl. ............. 164/72; 164/47; 428/450; 528/15; 528/25; 528/31; 525/478; 525/479
(58) Field of Classification Search .......... None
See application file for complete search history.

(56) References Cited

U.S. PATENT DOCUMENTS

| | | | | |
|---|---|---|---|---|
| 6,249,637 | B1 * | 6/2001 | Weigel | 385/139 |
| 7,714,053 | B2 * | 5/2010 | Adler et al. | 524/430 |
| 2007/0100072 | A1 * | 5/2007 | Akitomo et al. | 525/92 G |

FOREIGN PATENT DOCUMENTS

| JP | Hei 09-012886 A | 1/1997 |
|---|---|---|
| JP | 2008-069215 A | 3/2008 |

\* cited by examiner

*Primary Examiner* — Marc Zimmer
(74) *Attorney, Agent, or Firm* — Fitch, Even, Tabin & Flannery, LLP

(57) ABSTRACT

An organo-modified silicone obtained by an addition reaction of (I) a chain silicone represented by formula (1):

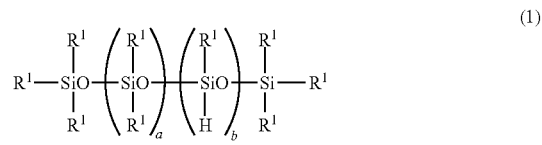

wherein the formula (1), $R^1$s represent hydrocarbon groups having 1 to 3 carbon atoms, and a and b are numbers satisfying conditions represented by the following formulae (i) to (iii):

$0 \leq a \leq 195$  (i)

$5 \leq b$  (ii)

$10 \leq a+b \leq 200$  (iii), with (II) a hydrocarbon such as monoolefins and aromatic hydrocarbons, and (III) a di(meth)acrylic acid ester,
at a molar ratio satisfying conditions represented by the following formula (iv):

{the chain silicone}:{the hydrocarbon}:{the di(meth)acrylic acid ester}=$A$:$B$:$C$  (iv)

wherein the formula (iv), A represents a number of moles of the chain silicone, and B and C are numbers satisfying conditions represented by the following formulae (v) and (vi):

$0.05A \leq C \leq A$  (v)

$A \times b - 2C = B$  (vi)

in the presence of a hydrosilylation catalyst.

10 Claims, No Drawings

ORGANO-MODIFIED SILICONE, MOLD RELEASE AGENT FOR MOLD CASTING COMPRISING THE SAME, AND MOLD CASTING METHOD USING THE SAME

CROSS-REFERENCE TO RELATED APPLICATIONS

This U.S. Application claims priority from Japanese Patent Application 2010-282428, filed Dec. 17, 2010, the complete disclosure of which is hereby incorporated herein by reference in its entirety for all purposes.

BACKGROUND OF THE INVENTION

1. Field of the Invention

The present invention relates to an organo-modified silicone suitable for a mold release agent for mold casting used for mold casting of non-iron metals such as aluminum, magnesium, and zinc, and also relates to a mold release agent for mold casting comprising the organo-modified silicone, and a mold casting method using the mold release agent.

2. Related Background Art

Silicones such as dimethylsilicone, alkyl-modified silicones, alkyl- and aralkyl-co-modified silicones, and alkyl- and ester-co-modified silicones have been conventionally used as typical components in mold release agents for mold casting.

The alkyl-modified silicones, the alkyl- and aralkyl-co-modified silicones, and the alkyl- and ester-co-modified silicones have lubricity because of side chain groups thereof such as alkyl groups, aralkyl groups, and ester groups. Moreover, since the alkyl-modified silicones, the alkyl- and aralkyl-co-modified silicones, and the alkyl- and ester-co-modified silicones are gelled to form strong mold release coatings, when heated on molds. Hence, it is known that mold releasabilities of mold release agents using these silicones are further enhanced. However, although such a mold release agent can exhibit mold releasability under low-temperature conditions, the mold release agent has a problem that, when the temperature of a mold is high, sufficient mold releasability cannot be obtained because the silicone component is decomposed and volatilized. Meanwhile, although dimethylsilicone is a compound which is extremely stable even under high-temperature conditions, dimethylsilicone has a problem that the mold releasability of the obtained mold release agent is insufficient, because dimethylsilicone has high heat resistance, and hence does not form a mold release coating as described above when heated on a mold.

Meanwhile, in order to enhance the mold releasability under high-temperature conditions, developments have been made in which the adhesion of a mold release agent to a mold is improved by increasing the viscosity of an organo-modified silicone. For example, Japanese Unexamined Patent Application Publication No. Hei 09-12886 (Document 1) discloses a mold release agent using a condensation reaction product of a diorganopolysiloxane having a hydrolyzable group as a side chain, and Japanese Unexamined Patent Application Publication No. 2008-69215 (Document 2) discloses a mold release agent using a branched organo-modified silicone in which molecules of an organo-modified silicone are crosslinked with each other through a hydrocarbon group or a conjugated diene having double bonds at both terminals. However, since the diorganopolysiloxane described in Document 1 has a hydrolyzable group, the diorganopolysiloxane has a problem that, when used for a mold release agent for mold casting, the diorganopolysiloxane becomes unstable, and cannot provide a sufficient mold releasability. Meanwhile, since the branched organo-modified silicone described in Document 2 has a high viscosity, the adhesion of the obtained mold release agent to a mold is improved. However, the branched organo-modified silicone has a problem that the mold releasability of the obtained mold release agent is still insufficient, and particularly when the branched organo-modified silicone is used for an oil-based mold release agent for mold casting, the mold releasability thereof is further lowered.

SUMMARY OF THE INVENTION

The present invention has been made in view of the above-described problems of the conventional technologies, and an object of the present invention is to provide an organo-modified silicone capable of imparting an excellent mold releasability to a mold release agent for mold casting, a mold release agent for mold casting comprising the organo-modified silicone, and a mold casting method using the mold release agent.

The present inventors have conducted earnest study to achieve the above object. As a result, the present inventors have found that an organo-modified silicone obtained by an addition reaction of a specific chain silicone with a specific monoolefin and/or a specific aromatic hydrocarbon having an alkenyl group, and a specific di(meth)acrylic acid ester in the presence of a hydrosilylation catalyst with a specific molar ratio condition being satisfied is capable of imparting an excellent lubricity, i.e., an excellent mold releasability to a mold release agent for mold casting in water-based solvents and oil-based solvents and even under high-temperature conditions. This finding has led to the completion of the present invention.

Specifically, the organo-modified silicone of the present invention is as follows.

[1] An organo-modified silicone obtained by an addition reaction of (I) a chain silicone represented by the following general formula (1):

[Chem. 1]

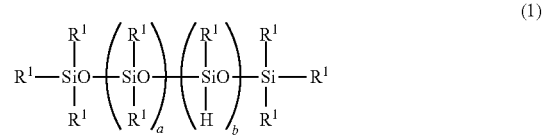

[in the formula (1), $R^1$s each independently represent a hydrocarbon group having 1 to 3 carbon atoms, and a and b are numbers satisfying conditions represented by the following formulae (i) to (iii):

$$0 \leq a \leq 195 \quad (i)$$

$$4 \leq b \quad (ii)$$

$$10 \leq a+b \leq 200 \quad (iii)], \text{ with}$$

(II) at least one hydrocarbon selected from the group consisting of monoolefins having 4 to 18 carbon atoms and aromatic hydrocarbons having an alkenyl group and 8 to 12 carbon atoms, and (III) a di(meth)acrylic acid ester represented by the following general formula (2):

[Chem. 2]

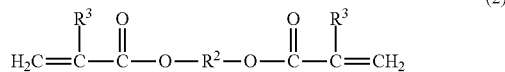

(2)

[in the formula (2), $R^2$ represents any one selected from the group consisting of linear chain alkylene groups having 2 to 16 carbon atoms, branched chain alkylene groups having 2 to 16 carbon atoms, and oxyalkylene groups whose number of repetitions of an oxyalkylene having 2 to 4 carbon atoms is 1 to 6, and $R^3$s each independently represent a hydrogen atom or a methyl group], at a molar ratio satisfying a condition represented by the following formula (iv):

{a number of moles of the (I) chain silicone}:{a number of moles of the (II) hydrocarbon}:{a number of moles of the (III) di(meth)acrylic acid ester}=$A$:$B$:$C$     (iv)

[in the formula (iv), A represents a number of moles of the (I) chain silicone determined from a number average molecular weight of the (I) chain silicone, and B and C are numbers satisfying conditions represented by the following formulae (v) and (vi):

$0.05A \leq C \leq A$     (v)

$A \times b - 2C = B$     (vi)

[in the formula (vi), b has the same meaning as that of b in the formula (1)]] in the presence of a hydrosilylation catalyst.

[2] The organo-modified silicone according to [1], which is represented by the following general formula (3):

[Chem. 3]

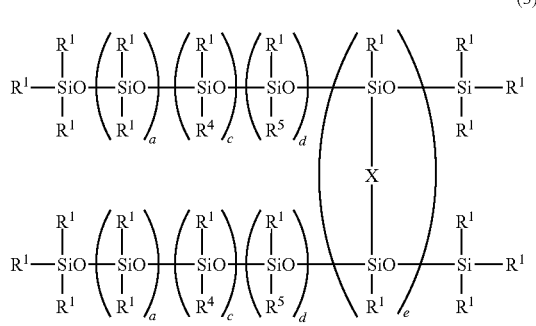

(3)

[in the formula (3), $R^1$s each independently represent a hydrocarbon group having 1 to 3 carbon atoms, $R^4$s each independently represent a hydrocarbon group having 4 to carbon atoms, $R^5$s each independently represent an aralkyl group having 8 to 12 carbon atoms, Xs each independently represent a diester structure represented by the following general formula (4):

[Chem. 4]

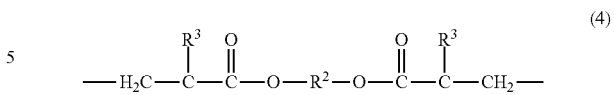

(4)

[in the formula (4), $R^2$ represents any one selected from the group consisting of linear chain alkylene groups having 2 to 16 carbon atoms, branched chain alkylene groups having 2 to 16 carbon atoms, and oxyalkylene groups whose number of repetitions of an oxyalkylene having 2 to 4 carbon atoms is 1 to 6, and $R^3$s each independently represent a hydrogen atom or a methyl group], and a, c, d, and e are each independently a number satisfying conditions represented by the following formulae (i), and (vii) to (xi):

$0 \leq a \leq 195$     (i)

$0 \leq c \leq 199.9$     (vii)

$0 \leq d \leq 199.9$     (viii)

$0.1 \leq e \leq 2$     (ix)

$5 \leq c+d+e$     (x)

$10 \leq a+c+d+e \leq 200$     (xi)]

In addition, a mold release agent for mold casting of the present invention is as follows.

[3] A mold release agent for mold casting, comprising the organo-modified silicone of the present invention according to [1] or [2].

[4] The mold release agent for mold casting according to [3], which further comprises a surfactant and water and is a water-based mold release agent for mold casting.

[5] The mold release agent for mold casting according to [3], which further comprises a liquid organic compound and is an oil-based mold release agent for mold casting.

Moreover, a mold casting method of the present invention is a mold casting method, comprising casting a metal formed article by use of the mold release agent for mold casting according to any one of [3] to [5].

Note that, although it is not exactly clear why the above-described object is achieved by the organo-modified silicone of the present invention, the mold release agent for mold casting comprising the organo-modified silicone, and the mold casting method using the mold release agent, the present inventors speculate as follows. Specifically, the present invention makes it possible to provide an organo-modified silicone in which molecules of an alkyl-modified silicone and/or an aralkyl-modified silicone are cross-linked with each other through a specific diester structure. The present inventors speculate that, in a case of a mold release agent for mold casting using such an organo-modified silicone, when a formed article is taken out from a mold, the ester bond in the cross-linked structure moiety is cleaved, and hence, the friction occurring when the formed article is taken out the mold is reduced, so that an excellent lubricity, i.e., an excellent mold releasability is achieved.

In addition, the present inventors also speculate as follows. The organo-modified silicone of the present invention is stable in water-based solvents and in oil-based solvents. Hence, the organo-modified silicone of the present invention can exhibit an excellent mold releasability, when used for a water-based mold release agent for mold casting, and also when used for an oil-based mold release agent for mold casting. Moreover, the organo-modified silicone of the present invention has a high viscosity. Hence, a mold release agent for mold casting of the present invention comprising the organo-modified silicone is highly adhesive to a mold, and can hold an excellent mold releasability even under high-temperature conditions. In addition, the mold release agent for mold casting of the present invention can be applied onto a wider area than conventional mold release agents by spray application, which is a major method for applying a mold release agent for mold casting. Hence, the amount of the mold release agent for mold casting used can be reduced.

According to the present invention, it is possible to provide an organo-modified silicone capable of imparting an excellent mold releasability to a mold release agent for mold casting, a mold release agent for mold casting comprising the organo-modified silicone, and a mold casting method using the mold release agent.

DETAILED DESCRIPTION OF THE PREFERRED EMBODIMENTS

Hereinafter, the present invention will be described in detail on the basis of preferred embodiments thereof.

First, an organo-modified silicone of the present invention will be described. The organo-modified silicone of the present invention is one obtained by an addition reaction of (I) a chain silicone with (II) a monoolefin having 4 to 18 carbon atoms and/or an aromatic hydrocarbon having an alkenyl group and 8 to 12 carbon atoms and (III) a di(meth)acrylic acid ester in the presence of a hydrosilylation catalyst, with a specific molar ratio condition being satisfied.

The (I) chain silicone used in the present invention is represented by the following general formula (1):

[Chem. 5]

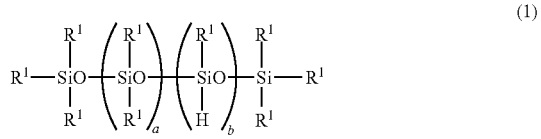

In the formula (1), $R^1$s each independently represent a hydrocarbon group having 1 to 3 carbon atoms, which may be of a linear chain or a branched chain, and may be saturated or unsaturated. Examples of the hydrocarbon group include a methyl group, an ethyl group, a propyl group, and an isopropyl group. Of these groups, a methyl group is preferable from the viewpoint of industrial availability.

In the formula (1), a and b are numbers satisfying conditions represented by the following formulae (i) to (iii):

$$0 \leq a \leq 195 \quad (i)$$

$$5 \leq b \quad (ii)$$

$$10 \leq a+b \leq 200 \quad (iii)$$

When a is 0, the group represented by the formula: $-SiOR^1R^1-$ is a single bond. If the value of a exceeds the upper limit, or if the value of b is less than the lower limit, the mold releasability achieved when the obtained organo-modified silicone is used for a mold release agent is lowered. Meanwhile, if the total of a and b (a+b) is less than the lower limit, the viscosity of the obtained organo-modified silicone is lowered, so that the adhesion achieved when the obtained organo-modified silicone is used for a mold release agent is lowered. On the other hand, if the total of a and b (a+b) exceeds the upper limit, the obtained organo-modified silicone has a high viscosity, and becomes difficult to handle. In addition, (a+b) is preferably 40 to 60, and more preferably 50, from the viewpoint of industrial availability. Note that, in the present invention, the values of a and b can be obtained by the following methods. First, since hydrogen gas generated in a reaction of the chain silicone with an aqueous sodium hydroxide solution and an alcohol corresponds to hydrogen originated from the hydrosilyl group in the formula (1), the ratio between a and b in the formula (1) can be obtained by measuring the amount of hydrogen gas. Moreover, the value of b, which is the number of hydrosilyl groups, can be obtained by measuring the number average molecular weight of an alkyl-modified silicone, which is an addition reaction product obtained by adding a monoolefin to the hydrosilyl groups of the chain silicone in the presence of a hydrosilylation catalyst, by gel permeation chromatography (GPC) (relative to polyethylene glycol (PEG)). Then, the value of a can be obtained from the ratio between a and b.

Examples of the chain silicone include methylhydrogenpolysiloxanes whose degree of polymerization is 3 to 200, dimethylsiloxane-methylhydrogensiloxane copolymers, and the like. One kind of these chain silicones alone or a combination of two or more thereof may be used. Of these chain silicones, a methylhydrogenpolysiloxane whose degree of polymerization is 50 is preferably used as the chain silicone from the viewpoint of industrial availability.

Since such a chain silicone has five or more hydrosilyl groups (—SiH), the chain silicone reacts with carbon-carbon double bonds of the (II) monoolefin and/or aromatic hydrocarbon having an alkenyl group, and the (III) di(meth)acrylic acid ester, which will be described later, in the presence of the hydrosilylation catalyst. As a result, the organo-modified silicone of the present invention can be obtained.

The (II) monoolefin having 4 to 18 carbon atoms used in the present invention may be of a linear chain or a branched chain, or may have a cyclic structure. When the monoolefin has a cyclic structure, the monoolefin has one linear chain structure having a carbon-carbon double bond and two or more carbon atoms. If the number of carbon atoms of the monoolefin is less than the lower limit, the mold releasability achieved when the obtained organo-modified silicone is used for a mold release agent is lowered. Meanwhile, if the number of carbon atoms of the monoolefin exceeds the upper limit, the obtained organo-modified silicone has a high melting point, and hence becomes difficult to handle in industrially manufacturing the organo-modified silicone of the present invention. The monoolefin is preferably an linear chain α-olefin having 6 to 12 carbon atoms, from the viewpoint that the lubricity of a mold release agent for which the obtained organo-modified silicone is used tends to be enhanced. Examples of the α-olefin include 1-hexene, 1-octene, 1-heptene, 1-octene, 1-nonene, 1-decene, 1-undecene, and 1-dodecene. One kind of these monoolefins alone or a combination of two or more thereof may be used as the α-olefin.

The (II) aromatic hydrocarbon having an alkenyl group and 8 to 12 carbon atoms used in the present invention has one alkenyl group having 2 to 6 carbon atoms on their aromatic ring. If the number of carbon atoms of the aromatic hydrocarbon exceeds the upper limit, the mold releasability achieved when the obtained organo-modified silicone is used for a mold release agent is lowered. The alkenyl group may be of a linear chain or a branched chain. The carbon-carbon double bond is present preferably at a terminal from the viewpoint that the organo-modified silicone of the present invention can be produced industrially easily. Examples of the aromatic hydrocarbon having an alkenyl group include styrene, α-methylstyrene, vinylnaphthalene, and the like.

One kind of these aromatic hydrocarbons having an alkenyl group alone or a combination of two or more thereof may be used as the aromatic hydrocarbon.

Any one of the monoolefin and the aromatic hydrocarbon having an alkenyl group alone may be used, or a combination of the two may be used. When a combination of the two is used, the molar ratio therebetween is not particularly limited. The monoolefin is preferably 0.5 to 5 mol per mole of the aromatic hydrocarbon having an alkenyl group, from the viewpoint that a mold release agent having an enhanced lubricity can be obtained.

The (III) di(meth)acrylic acid ester used in the present invention is an alkanediol di(meth)acrylate or an alkylene glycol di(meth)acrylate represented by the following general formula (2):

[Chem. 6]

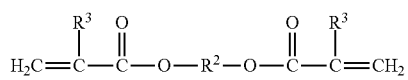

(2)

Note that, in the present invention, a (meth) acrylic acid refers to methacrylic acid or acrylic acid, and a (meth)acrylate refers to a methacrylate or an acrylate.

In the formula (2), $R^2$ represents an alkylene group or an oxyalkylene group. The alkylene group may be of a linear chain or a branched chain. The number of carbon atoms of the alkylene group is 2 to 16 from the viewpoint that the mold releasability achieved when the obtained organo-modified silicone is used for a mold release agent is excellent. In addition, the number of carbon atoms is preferably 2 to 12 from the viewpoint of industrial availability. Examples of the alkylene group include a trimethylene group, a propylene group, a tetramethylene group, an ethylethylene group, a 2-methyltrimethylene group, a pentamethylene group, a hexamethylene group, a heptamethylene group, an octamethylene group, a nonylmethylene group, and the like.

In the oxyalkylene group, the number of carbon atoms of the oxyalkylene constituting the oxyalkylene group is 2 to 4. If the number of carbon atoms exceeds the upper limit, the mold releasability achieved when the obtained organo-modified silicone is used for a mold release agent is lowered. Examples of the oxyalkylene include oxyethylene, oxypropylene, oxytetramethylene, and oxybutylene. Of these oxyalkylenes, oxyethylene and oxypropylene are preferable from the viewpoint that the mold releasability achieved when the obtained organo-modified silicone is used for a mold release agent is enhanced. In addition, the number of repetitions of the oxyalkylene is 1 to 6. If the number of repetitions exceeds the upper limit, the mold releasability achieved when the obtained organo-modified silicone is used for a mold release agent is lowered. Moreover, the number of repetitions is preferably 1 to 4 from the viewpoint of industrial availability. As the oxyalkylene group, one kind of or two or more kinds of the oxyalkylenes may be employed. It is more preferable that oxyethylene or oxypropylene be repeated alone, from the viewpoint of industrial availability.

In the formula (2), $R^3$s each independently represent a hydrogen atom or a methyl group, and is preferably a hydrogen atom from the viewpoint of industrial availability.

Examples of the di(meth)acrylic acid ester include alkanediol di(meth)acrylates such as ethanediol di(meth)acrylate, 1,3-propanediol di(meth)acrylate, 1,4-butanediol di(meth)acrylate, 1,5-heptanediol di(meth)acrylate, 1,6-hexanediol di(meth)acrylate, 1,8-octanediol di(meth)acrylate, 1,9-nonanediol di(meth)acrylate, 1,10-decanediol di(meth)acrylate, and ethylene glycol di(meth)acrylate; and alkylene glycol di(meth)acrylates such as tetraethylene glycol di(meth)acrylate and 1,3-butylene glycol di(meth)acrylate. Of these di(meth)acrylic acid esters, 1,6-hexanediol diacrylate, 1,4-butanediol di(meth)acrylate, 1,9-nonanediol di(meth)acrylate, or tetraethylene glycol di(meth)acrylate is preferably used as the di(meth)acrylic acid ester from the viewpoint of industrial availability. In addition, one kind of these di(meth) acrylic acid esters alone or a combination of two or more thereof may be used as the di(meth)acrylic acid ester.

The di(meth)acrylic acid esters each have carbon-carbon double bonds in the both terminals, and a diester structure. Hence, molecules of one or two or more selected from the group consisting of alkyl-modified silicones, aralkyl-modified silicones, and alkyl- and aralkyl-co-modified silicones can be cross-linked through the diester structure. By use of the organo-modified silicone having such a cross-linked structure of the present invention, an excellent lubricity, i.e., an excellent mold releasability can be imparted to the mold release agent.

In the present invention, the molar ratio between the (I) chain silicone, the (II) monoolefin and/or aromatic hydrocarbon having an alkenyl group, and the (III) di(meth)acrylic acid ester needs to satisfy a condition represented by the following formula (iv):

{a number of moles of the (I) chain silicone}:{a number of moles of the (II) hydrocarbon}:{a number of moles of the (III) di(meth)acrylic acid ester}=$A:B:C$ (iv)

In the formula (iv), A represents the number of moles of the (I) chain silicone determined from the number average molecular weight of the (I) chain silicone. In the present invention, the number of moles determined from the number average molecular weight refers to a number obtained by dividing the mass of the (I) chain silicone by the number average molecular weight thereof. In the present invention, the number average molecular weight of the (I) chain silicone is a molecular weight calculated from a and b in the formula (1), and the values of a and b can be obtained by the above-described method.

In the formula (iv), B and C are numbers satisfying conditions represented by the following formulae (v) and (vi):

$$0.05A \leq C \leq A \quad (v)$$

$$A \times b - 2C = B \quad (vi)$$

In the formula (vi), b has the same meaning as that of b in the general formula (1). Regarding the condition represented by the formula (v), if the value of C is less than the lower limit, the viscosity of the obtained organo-modified silicone is lowered, so that the adhesion achieved when the obtained organo-modified silicone is used for a mold release agent is lowered. Meanwhile, if the value of C exceeds the upper limit, the obtained organo-modified silicone has a high viscosity, and hence becomes difficult to handle. In addition, the value of C is preferably in the range from 0.15 A to 0.5 A, from the viewpoint that an enhanced mold releasability can be imparted to a mold release agent for mold casting. In the condition represented by the formula (vi), the value of B represents the number of hydrosilyl groups which exist in the (I) chain silicone, but are not cross-linked with the (III) di(meth)acrylic acid ester.

In the present invention, the (I) chain silicone is subjected to an addition reaction with the (II) monoolefin and/or aromatic hydrocarbon having an alkenyl group and the (III) di(meth)acrylic acid ester at a molar ratio satisfying the above-described condition in the presence of a hydrosilylation catalyst.

The hydrosilylation catalyst is a catalyst which causes a reaction of the hydrosilyl groups of the (I) chain silicone with carbon-carbon double bonds of the (II) monoolefin and/or aromatic hydrocarbon having an alkenyl group and the (III) di(meth)acrylic acid ester. As the hydrosilylation catalyst, any known hydrosilylation catalyst can be used without any limitation. Examples of the hydrosilylation catalyst include group VIII transition metals, compounds thereof, and the like. Examples of the group VIII transition metals include platinum, palladium, rhodium, ruthenium, and the like. Examples of the compounds of the group VIII transition metals include $PtCl_4$, $H_2PtCl_6 \cdot 6H_2O$, Pt-ether complexes, Pt-olefin complexes, Pt-divinyltetramethyldisiloxane complex, $PdCl_2(PPh_3)_2$, $PdCl_2(PhCN)_2$, $RhCl_2(PPh_3)_3$, and the like. One kind of these hydrosilylation catalysts alone or a combination of two or more thereof may be used as the hydrosilylation catalyst. If necessary, the hydrosilylation catalyst may diluted with any one of alcoholic solvents, aromatic compound solvents, hydrocarbon solvents, ketone solvents, basic solvents, and mixed solvents thereof, before use. The amount of the hydrosilylation catalyst used is preferably an amount with which the metal element in the catalyst can be 1 to 50 ppm by mass relative to the total mass of the reactants (excluding the solvent and the like) in the system, and is preferably an amount with which the metal element in the catalyst can be 1 to 5 ppm by mass, from the economical viewpoint.

As the addition reaction according to the present invention, a known reaction method can be employed as appropriate. In addition, the order of addition of the (II) monoolefin and/or aromatic hydrocarbon having an alkenyl group and the (III) di(meth)acrylic acid ester to the (I) chain silicone is not particularly limited. (II) and (III) may be added to (I) simultaneously. Alternatively, (II) and (III) may be sequentially reacted with (I), or may be alternately reacted with (I) as appropriate.

The conditions for the addition reaction can be adjusted as appropriate depending on the reaction method employed. For example, the reaction may be carried out at a temperature of 50 to 150° C. for 6 to 12 hours. If the temperature is lower than the lower limit, the reaction tends to proceed less readily. Meanwhile, if the temperature exceeds the upper limit, the reaction tends to be difficult to control. Note that, the completion of the addition reaction can be checked by conducting FT-IR analysis on the obtained organo-modified silicone, where the disappearance of the absorption spectrum attributable to the hydrosilyl groups of the (I) chain silicone, which is a raw material, indicates the completion.

The organo-modified silicone of the present invention can be obtained by the aforementioned production method. The organo-modified silicone of the present invention is preferably represented by the following general formula (3):

[Chem. 7]

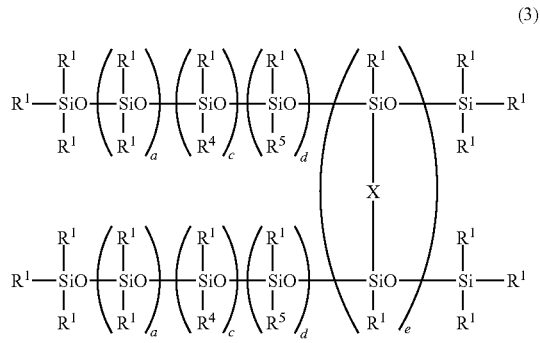

(3)

$R^1$s in the formula (3) have the same meaning as those of $R^1$s in the formula (1). $R^4$s in the formula (3) are groups derived from the (II) monoolefin having 4 to 18 carbon atoms, and each independently represent a hydrocarbon group having 4 to 18 carbon atoms, which may be of a linear chain or a branched chain, or may have a cyclic structure. The group is preferably of a chain, and more preferably of a linear chain. If the number of carbon atoms of each $R^4$ is less than the lower limit, the mold releasability achieved when the obtained organo-modified silicone is used for a mold release agent is lowered. The hydrocarbon group is preferably a linear chain group having 6 to 12 carbon atoms, from the viewpoint that the lubricity of a mold release agent for which the obtained organo-modified silicone is used is enhanced. Preferred examples thereof include a hexyl group, a heptyl group, an octyl group, a nonyl group, a decyl group, an undecyl group, a dodecyl group, and the like. Meanwhile, in the formula (3), $R^5$s are groups derived from the (II) aromatic hydrocarbon having an alkenyl group and 8 to 12 carbon atoms and each independently represent an aralkyl group having 8 to 12 carbon atoms. If the number of carbon atoms of each $R^5$ exceeds the upper limit, the mold releasability achieved when the obtained organo-modified silicone is used for a mold release agent is lowered. Examples of the aralkyl group include a benzyl group, a phenylethyl group, a phenylpropyl group, a 2-phenylpropyl group, a phenylbutyl group, a phenylpentyl group, a phenylhexyl group, a 2-(1-naphthyl)ethyl group, and the like. Of these aralkyl groups, a phenylethyl group and a 2-phenylpropyl group are preferable from the viewpoint of industrial availability of the materials.

In the formula (3), Xs are structures derived from the (III) di(meth)acrylic acid ester and each independently represent a diester structure represented by the following general formula (4):

[Chem. 8]

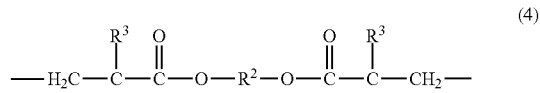

(4)

$R^2$ and $R^3$ in the formula (4) have the same meanings as those of $R^2$ and $R^3$ in the formula (2), respectively.

In the formula (3), a, c, d, and e are numbers satisfying conditions represented by the following formulae (i), and (vii) to (xi):

$$0 \leq a \leq 195 \quad \text{(i)}$$

$$0 \leq c \leq 199.9 \quad \text{(vii)}$$

$$0 \leq d \leq 199.9 \quad \text{(viii)}$$

$$0.1 \leq e \leq 2 \quad \text{(ix)}$$

$$5 \leq c+d+e \quad \text{(x)}$$

$$10 \leq a+c+d+e \leq 200 \quad \text{(xi)}.$$

When a is 0, the group represented by the formula: —SiOR$^1$R$^1$— is a single bond. When c is 0, the group represented by the formula: —SiOR$^1$R$^4$— is a single bond. When d is 0, the group represented by the formula: —SiOR$^1$R$^5$— is a single bond. If the value of a exceeds the upper limit, the mold releasability achieved when the obtained organo-modified silicone is used for a mold release agent is lowered.

In the formula (3), e represents the content of the diester structure in the organo-modified silicone of the present invention represented by the formula (3). Specifically, for example, a where e is 1 indicates that an organo-modified silicone of the present invention obtainable from 2 mol of the (I) chain silicone contains 1 mol of the diester structure represented by the formula (4) on average. A case where e is 0.5 indicates that an organo-modified silicone of the present invention obtainable from 4 mol of the (I) chain silicone contains 1 mol of the diester structure on average. A case where e is 0.1 indicates that an organo-modified silicone of the present invention obtainable from 20 mol of the (I) chain silicone contains 1 mol of the diester structure on average. A case where e is 2 indicates that an organo-modified silicone of the present invention obtainable from 2 mol of the (I) chain silicone contains 2 mol of the diester structure on average. If the value of e is less than the lower limit, the viscosity of the obtained organo-modified silicone is lowered, so that the adhesion achieved when the organo-modified silicone is used for a mold release agent is lowered. Meanwhile, if the value of e exceeds the upper limit, the obtained organo-modified silicone has a high viscosity, and hence because difficult to handle. In addition, the value of e is preferably in the range from 0.2 to 1, from the viewpoint that an enhanced mold releasability can be imparted to the mold release agent for mold casting.

If the total of c to e (c+d+e) in the formula (3) is less than the lower limit, the mold releasability achieved when the obtained organo-modified silicone used for a mold release agent is lowered. If the total of a, and c to e (a+c+d+e) in the formula (3) is less than the lower limit, the viscosity of the obtained organo-modified silicone is lowered, so that the adhesion achieved when the organo-modified silicone is used for a mold release agent is lowered. Meanwhile, if the total of a, and c to e (a+c+d+e) exceeds the upper limit, the obtained organo-modified silicone has a high viscosity, and hence becomes difficult to handle. In addition, from the viewpoint of industrial availability of raw materials, (a+c+d+e) is preferably 40 to 60, and more preferably 50. Moreover, from the viewpoint that a mold release agent for mold casting having an enhanced lubricity can be obtained, the ratio of c and d (c:d) preferably satisfies a condition of 1:2 to 5:1.

In the formula (3), a, c, and d may be the same or different, and the sequence of the groups represented by the formula: —SiOR$^1$R$^1$— and repeated a times, the groups represented by the formula: —SiOR$^1$R$^4$— and repeated c times, the groups represented by the formula: —SiOR$^1$R$^5$— and repeated d times, and the groups having the diester structure and being repeated e times is not limited to this order, and may be arranged in a random manner or a block manner.

The organo-modified silicone has a structure in which molecules of the alkyl-modified silicone and/or the aralkyl-modified silicone are cross-linked with each other through a specific diester structure. The present inventors speculate that, owing to this structure, the organo-modified silicone has a viscosity enough to obtain a good adhesion to a mold when the organo-modified silicone is used for a mold release agent for mold casting, and that an enhanced lubricity, i.e., an enhanced mold releasability can be achieved by the diester structure. Note that, in the present invention, the viscosity of the organo-modified silicone at 25° C. can be measured by a method according to JIS K7117-1 (1999) by use of a single-cylinder rotational viscometer (B type viscometer). The viscosity of the organo-modified silicone of the present invention at 25° C. is preferably 1000 mPa·s or more. The viscosity of is more preferably 1000 to 40000 mPa·s from the viewpoint that the organo-modified silicone can be handled more easily when used for a mold release agent for mold casting.

Subsequently, a mold release agent for mold casting of the present invention will be described. The mold release agent for mold casting of the present invention comprises the above-described organo-modified silicone of the present invention. In the present invention, the mold release agent for mold casting means a mold release agent used for mold casting and a lubricant used for mold casting.

In the mold release agent for mold casting of the present invention, the content of the organo-modified silicone can be adjusted as appropriate depending on the form of the mold release agent and the organo-modified silicone used, and is preferably 0.05 to 40% by mass. In addition, the mold release agent for mold casting of the present invention may further comprise a surfactant, water, an organic solvent, additives, and the like, unless the achievement of the object of the present invention is obstructed. The mold release agent for mold casting may be a water-based mold release agent for mold casting comprising a water-based solvent, or an oil-based mold release agent for mold casting comprising an oil-based solvent. The organo-modified silicone of the present invention can impart an excellent mold releasability and adhesion to a mold release agent for mold casting, when contained in a water-based mold release agent for mold casting, and also when contained in an oil-based mold release agent for mold casting.

In the present invention, the water-based mold release agent for mold casting (hereinafter referred to as the water-based mold release agent in some cases) is preferably an emulsion comprising the organo-modified silicone of the present invention, a surfactant, and water, where the water serves as a dispersion medium. The organo-modified silicone of the present invention can be emulsified stably in water by the surfactant. In the water-based mold release agent, the content of the organo-modified silicone is preferably 0.05 to 40% by mass. If the content is less than the lower limit, a sufficient mold releasability tends not to be obtained. Meanwhile, if the content exceeds the upper limit, the water-based mold release agent tends to have a lowered fluidity, and hence tends to be difficult to handle.

The surfactant is not particularly limited, as long as the organo-modified silicone used can be emulsified stably. Examples of the surfactant include nonionic surfactants such as higher alcohol alkylene oxide adducts, fatty acid alkylene oxide adducts, higher amine alkylene oxide adducts, fatty acid amide alkylene oxide adducts, and the like. The content of the surfactant can be adjusted as appropriate depending on the organo-modified silicone of the present invention used, and is preferably 5 to 25% by mass relative to the content of the organo-modified silicone in the water-based mold release agent, from the viewpoint of obtaining an excellent emulsion stability and mold releasability with the minimum amount.

As the water, tap water, pure water, ion-exchanged water, or the like can be used. The content of the water can be adjusted as appropriate so that the content of the organo-modified silicone can be within the above-described range.

In addition, if necessary, the water-based mold release agent may further comprise additives conventionally used for mold release agents for mold casting, within the range not impairing the adhesion and the mold releasability of the water-based mold release agent. Examples of the additives include anionic surfactants such as alkyl sulfates and Tamol-type anionic surfactants; cationic surfactants such as tetraalkylammonium salts; amphoteric surfactants such as alkylbetaines; nonionic surfactants other than those described above; vegetable oils such as coconut oil, soybean oil, and rapeseed oil; mineral oils; silicone compounds such as silicones, dimethylsilicone, alkyl-modified silicones, and alkyl- and aralkyl-modified silicones; fats and fatty oils; synthetic ester oils; oil-based agents; synthetic waxes; anti-foaming agents; thickeners; corrosion inhibitors; preservatives; water-based polymers; pH adjusters; anti-mold agents; and the like. In order to enhance smoke prevention properties and flame resistance, the water-based mold release agent may further comprise an inorganic salt such as a bicarbonate, ammonium sulfate, or ammonium phosphate, or an inorganic substance such as boric acid. One kind of these additives alone or a combination of two or more thereof may be used. In addition, the content of the additives in the water-based mold release agent is preferably 10% by mass or less.

A method for producing the water-based mold release agent is not particularly limited. Examples of the method include a method in which an O/W emulsion is formed by mixing the organo-modified silicone of the present invention, the surfactant, the water, and, if necessary, the additives with each other, and then emulsifying the mixture by using, if necessary, an emulsifying apparatus such as a homogenizer, a colloid mill, or a planetary mixer.

In the present invention, the oil-based mold release agent for mold casting (hereinafter referred to as the oil-based mold release agent in some cases) is preferably one comprising the organo-modified silicone of the present invention and a liquid organic compound, where the liquid organic compound serves as a dispersion medium or a solvent. The content of the organo-modified silicone in the oil-based mold release agent is preferably 0.05 to 40% by mass. If the content is less than the lower limit, a sufficient mold releasability tends not to be obtained. Meanwhile, if the content exceeds the upper limit, the oil-based mold release agent tends to have a lowered fluidity, and hence tends to be difficult to handle.

Examples of the liquid organic compound include vegetable oils such as coconut oil, soybean oil, rapeseed oil, and palm oil; animal oil such as cattle oil and lard; mineral oils such as machine oils, turbine oils, spindle oils, cylinder oils, and lamp oils; monovalent alcohol esters and polyvalent alcohol esters of higher fatty acids, such as oleic acid, stearic acid, lauric acid, and tallow fatty acids; organomolybdenums; alcohols such as isopropanol; ethers such as tetrahydrofuran and dioxane; aromatic hydrocarbons such as toluene and xylene; chlorinated hydrocarbons; ketones such as acetone and methyl ethyl ketone; and mixtures thereof. Of these liquid organic compounds, a mineral oil or an aromatic hydrocarbon is preferable as the liquid organic compound, from the viewpoint of an enhanced compatibility with the organo-modified silicone. The content of the liquid organic compound can be adjusted as appropriate so that the content of the organo-modified silicone can be within the above-described range.

If necessary, the oil-based mold release agent can further comprise additives conventionally used for mold release agents for mold casting, within a range not impairing the adhesion and mold releasability. Examples of the additives include the same additives exemplified for the water-based mold release agent, and the content thereof in the oil-based mold release agent is preferably 10% by mass or less.

A method for producing the oil-based mold release agent is not particularly limited, and an example of the method include a method in which the organo-modified silicone of the present invention, the liquid organic compound, and, if necessary, the additives are mixed with each other by use of, if necessary, an apparatus such as a mixer.

Subsequently, a mold casting method of the present invention will be described. The mold casting method of the present invention is a method comprising casting a metal formed article by use of the mold release agent for mold casting of the present invention. As the mold casting method of the present invention, any conventionally known method can be employed as appropriate, as long as the mold release agent for mold casting of the present invention is used. Examples of the mold casting method include die casting such as pressure die casting and squeeze casting; and low-pressure casting; and the like. Meanwhile, any non-iron metal conventionally used for metal formed articles can be used as a metal used for the metal formed article, and example thereof include aluminum, magnesium, zinc, and alloys thereof.

When the water-based mold release agent is used in the mold casting method as the mold release agent for mold casting of the present invention, for example, first, the obtained water-based mold release agent itself, or a material obtained by further adding water to the obtained water-based mold release agent and emulsifying the mixture is applied onto a surface of the mold on which forming is carried out. A conventionally known method can be employed as a method for the application, and examples thereof include a method (spray application) of spraying the water-based mold release agent by use of a spray gun, or the like. The amount applied in the application can be adjusted as appropriate depending on the content of the organo-modified silicone in the water-based mold release agent used, the kind of the molten metal injected into the mold, casting conditions such as the injection pressure and the mold temperature, and the like. For example, when a material is spray applied which is obtained by adding water to the water-based mold release agent so that the mass of the mixture can be 50 to 200 times that of the water-based mold release agent and then emulsifying the mixture, the amount of the application is preferably about 0.2 to 5 L for a forming mold having a surface area of about 0.2 m$^2$. The mold release agent for mold casting of the present invention can be applied by such spray application onto a wider area than conventional mold release agents. Hence, the amount of the mold release agent used can be reduced.

Meanwhile, when the oil-based mold release agent is used in the mold casting method of the present invention as the mold release agent for mold casting of the present invention, the obtained oil-based mold release agent itself, or a material obtained by further diluting or dispersing the oil-based mold release agent with the liquid organic compound is applied onto a surface of the mold on which forming is carried out. The method for the application and the applied amount are the same as described for the water-based mold release agent.

EXAMPLES

Hereinafter, the present invention will be described more specifically on the basis of Examples and Comparative Examples. However, the present invention is not limited to the following Examples.

1. Production of Organo-Modified Silicones

Methylhydrogensiloxanes (Chain Silicone I-1 and Chain Silicone I-2) used in production of organo-modified silicones were as follows.

(Chain Silicone I-1)

First, Chain Silicone I-1, an excessive amount of an aqueous sodium hydroxide solution, and ethanol were reacted with each other, and the amount of hydrogen gas generated was measured. The amount of hydrogen gas generated was 365 ml/g. From the obtained amount of hydrogen gas generated, the amount of hydrogen originated from hydrosilyl groups in Chain Silicone I-1 was determined to be 1.6% by mass, and the hydrosilyl group equivalent was 63 g/mol. Hence, a in the general formula (1) was 0.

Subsequently, Chain Silicone I-1 (63 g) and 1-octadecene (25 g, 0.15 mol) were placed in a reaction vessel equipped with a stirrer, a thermometer, a reflux condenser, a nitrogen gas inlet tube, and a dropping funnel, and mixed with each other with heating to 65° C., until the mixture became uniform. Subsequently, as a hydrosilylation catalyst, a solution of platinum (IV) chloride in a mixture of ethylene glycol monobutyl ether and toluene was added thereto, so that the concentration of platinum was 5 ppm relative to the reactants in the system. As a result, heat was generated. Hence, the reaction was carried out with cooling. When the temperature of the reactants reached 90° C., 1-octadecene (151 g, 0.90 mol) was added dropwise thereto, while the reactants were cooled to keep the temperature of the reactants at 80 to 110° C. After the dropwise addition, the reactants were heated to a temperature of 120° C., and the reaction was allowed to proceed with stirring for 4 hours. Thus, the addition reaction was completed. Thereafter, the excess of 1-octadecene was removed from the reaction product by pressure reduction and aspiration at 160° C. Thus, 225 g of an addition reaction product was obtained. The completion of the addition reaction was checked by conducting FT-IR analysis on the obtained addition reaction product, where the disappearance of the absorption spectrum attributable to SiH groups of the methylhydrogensiloxane, which was the raw material, indicated the completion of the addition reaction.

The number average molecular weight of the obtained addition reaction product was measured to be 11500 by the GPC method (relative to PEG), and b in the general formula (1) was 51. From a, b, and the number average molecular weight of the addition reaction product, the number average molecular weight of Chain Silicone I-1 was 3200.

(Chain Silicone 1-2)

First, the amount of hydrogen gas generated was measured to be 158 ml/g in the same manner as that of Chain Silicone I-1. From the obtained amount of hydrogen gas generated, the amount of hydrogen originated from hydrosilyl groups in Chain Silicone I-2 was 0.7% by mass, and the hydrosilyl group equivalent was 142 g/mol. Hence, a:b in the general formula (1) was 1:1.

Subsequently, an addition reaction product was obtained in the same manner as that for Chain Silicone I-1, except that Chain Silicone I-2 (142 g) was used instead of Chain Silicone I-1 (63 g). The number average molecular weight of the obtained addition reaction product was 6200, a in the general formula (1) was 22, b therein was 22, and the number average molecular weight of Chain Silicone I-2 was 3100.

Example 1

First, Chain Silicone I-1 (63 g, the number of moles determined from the number average molecular weight: 0.02 mol), 0.13 mol of α-methylstyrene (15 g), and 0.03 mol of 1-dodecene (5.0 g) were placed in a reaction vessel equipped with a stirrer, a thermometer, a reflux condenser, a nitrogen gas inlet tube, and a dropping funnel, and mixed with each other with heating to 65° C., until the mixture became uniform. Subsequently, as the hydrosilylation catalyst, a solution of platinum (IV) chloride in a mixture of ethylene glycol monobutyl ether and toluene was added thereto, so that the concentration of platinum was 5 ppm relative to the reactants in the system. As a result, heat was generated. Hence, the reaction was carried out with cooling. When the temperature of the reactants reached 90° C., 0.37 mol of α-methylstyrene (44 g) was added dropwise thereto, while the reactants were cooled to keep the temperature of the reactants at 80 to 110° C. After the dropwise addition, the reactants were heated to a temperature of 120° C., and the reaction was allowed to proceed with stirring for 1 hour. Thereafter, the reactants were cooled. When the temperature of the reactants was cooled to 90° C., 0.25 mol of 1-dodecene (42 g) was added dropwise thereto, while the reactants were cooled to keep the temperature of the reactants at 80 to 110° C. Thereafter, 0.01 mol of 1,4-butanediol diacrylate (2.0 g) was added thereto.

Subsequently, 0.25 mol of 1-dodecene (42 g) was added dropwise thereto, while the reactants were cooled to keep the temperature of the reactants at 80 to 110° C. Thereafter, the reactants were stirred at 100° C. for 1 hour and further at 120° C. for 4 hours. Thus, the addition reaction was completed. Thereafter, the excess of 1-dodecene was removed by aerating the reaction product at 120° C. Thus, an organo-modified silicone was obtained. The completion of the addition reaction was checked by conducting FT-IR analysis on the obtained organo-modified silicone, where the disappearance of the absorption spectrum attributable to SiH groups in the methylhydrogensiloxane, which was a raw material, indicated the completion of the addition reaction. In addition, the viscosity of the obtained organo-modified silicone at 25° C. was measured by a method according to JIS K7117-1 (1999) by use of a single-cylinder rotational viscometer (B type viscometer). Table 1 shows the raw material composition, yield, viscosity of the obtained organo-modified silicone, and Table 3 shows the composition of the obtained organo-modified silicone. In Table 3, $R^1$, $R^4$, $R^5$, X, a, c, d, and e represent $R^1$, $R^4$, $R^5$, X, a, c, d, and e in the general formula (3), respectively.

Example 2

An organo-modified silicone was obtained in the same manner as that of Example 1, except that 0.01 mol of 1,6-hexanediol diacrylate (2.3 g) was used instead of 0.01 mol of 1,4-butanediol diacrylate (2.0 g). Table 1 shows the raw material composition, yield, viscosity of the obtained organo-modified silicone, and Table 3 shows the composition of the obtained organo-modified silicone.

Example 3

An organo-modified silicone was obtained in the same manner as that of Example 1, except that 0.005 mol of 1,6-hexanediol diacrylate (1.1 g) was used instead of 0.01 mol of 1,4-butanediol diacrylate (2.0 g). Table 1 shows the raw material composition, yield, viscosity of the obtained organo-modified silicone, and Table 3 shows the composition of the obtained organo-modified silicone.

Example 4

An organo-modified silicone was obtained in the same manner as that of Example 1, except that 0.0027 mol of 1,6-hexanediol diacrylate (0.6 g) was used instead of 0.01 mol of 1,4-butanediol diacrylate (2.0 g). Table 1 shows the raw material composition, yield, viscosity of the obtained organo-modified silicone, and Table 3 shows the composition of the obtained organo-modified silicone.

Example 5

An organo-modified silicone was obtained in the same manner as that of Example 1, except that 0.005 mol of 1,9-nonanediol diacrylate (1.3 g) was used instead of 0.01 mol of 1,4-butanediol diacrylate (2.0 g). Table 1 shows the raw material composition, yield, viscosity of the obtained organo-modified silicone, and Table 3 shows the composition of the obtained organo-modified silicone.

Example 6

An organo-modified silicone was obtained in the same manner as that of Example 1, except that 0.005 mol of tetraethylene glycol diacrylate (1.5 g) was used instead of 0.01 mol of 1,4-butanediol diacrylate (2.0 g). Table 1 shows the raw material composition, yield, viscosity of the obtained organo-modified silicone, and Table 3 shows the composition of the obtained organo-modified silicone.

Example 7

An organo-modified silicone was obtained in the same manner as that of Example 1, except that Chain Silicone I-2 (142 g, the number of moles determined from the number average molecular weight: 0.046 mol) was used instead of Chain Silicone I-1, and that 0.005 mol of 1,6-hexanediol diacrylate (1.1 g) was used instead of 0.01 mol of 1,4-butanediol diacrylate (2.0 g). Table 1 shows the raw material composition, yield, viscosity of the obtained organo-modified silicone, and Table 3 shows the composition of the obtained organo-modified silicone.

Comparative Example 1

An organo-modified silicone was obtained in the same manner as that of Example 1, except that 0.01 mol of 1,4-butanediol diacrylate was not used. Table 2 shows the raw material composition, yield, and viscosity of the obtained organo-modified silicone.

Comparative Example 2

An organo-modified silicone was obtained in the same manner as that of Example 1, except that 0.01 mol of 1,5-hexadiene (0.8 g) was used instead of 0.01 mol of 1,4-butanediol diacrylate (2.0 g). Table 2 shows the raw material composition, yield, and viscosity of the obtained organo-modified silicone.

Comparative Example 3

An organo-modified silicone was obtained in the same manner as that of Example 1, except that 0.01 mol of 1,7-octadiene (1.1 g) was used instead of 0.01 mol of 1,4-butanediol diacrylate (2.0 g). Table 2 shows the raw material composition, yield, and viscosity of the obtained organo-modified silicone. Note that, in Comparative Example 3, the viscosity was measured in the same manner as that of Example 1. However, the viscosity exceeded the maximum viscosity (100000 mPa·s) measurable by this measurement method, and the viscosity was not measured accurately. Hence, the viscosity in Comparative Example 3 was shown as "high viscosity" in Table 2.

Comparative Example 4

An organo-modified silicone was obtained in the same manner as that of Example 1, except that 0.0055 mol of 1,7-octadiene (0.6 g) was used instead of 0.01 mol of 1,4-butanediol diacrylate (2.0 g). Table 2 shows the raw material composition, yield, and viscosity of the obtained organo-modified silicone.

Comparative Example 5

An organo-modified silicone was obtained in the same manner as that of Example 1, except that 0.005 mol of 1,9-decadiene (0.7 g) was used instead of 0.01 mol of 1,4-butanediol diacrylate (2.0 g). Table 2 shows the raw material composition, yield, and viscosity of the obtained organo-modified silicone.

Comparative Example 6

An organo-modified silicone was obtained in the same manner as that of Example 1, except that 0.01 mol of 5-vinylbicyclo[2,2,1]kept-2-ene (1.2 g) was used instead of 0.01 mol of 1,4-butanediol diacrylate (2.0 g). Table 2 shows the raw material composition, yield, and viscosity of the obtained organo-modified silicone.

Comparative Example 7

A dimethylsilicone (manufactured by Dow Corning Toray Co., Ltd., product name: DOW CORNING TORAY SH 200 FLUID 10000cs) (100 g) was uses as it was. Table 2 shows the viscosity of the dimethylsilicone.

Comparative Example 8

An alkyl- and aralkyl-modified silicone to which methyl groups, dodecyl groups, and the like were introduced (manufactured by WACKER, trade name: WACKER TN) (100 g) was used as it was. Table 2 shows the viscosity of the alkyl- and aralkyl-modified silicone.

Comparative Example 9

A mixture obtained by mixing 50 g of a dimethylsilicone (manufactured by Dow Corning Toray Co., Ltd., product name: DOW CORNING TORAY SH 200 FLUID 10000cs) with 50 g of an alkyl- and aralkyl-modified silicone to which methyl groups, dodecyl groups, and the like were introduced (manufactured by WACKER, trade name: WACKER TN) was used. Table 2 shows the viscosity of the mixture.

2. Production of Mold Release Agents for Mold Casting

Example 8

First, 20 parts by mass of the organo-modified silicone of Example 1 was mixed with 3 parts by mass of 9-mol ethylene oxide adducts of branched higher alcohols having 12 to 14 carbon atoms. Subsequently, the organo-modified silicone was emulsified in water by adding 77 parts by mass of water to the obtained mixture little by little with mixing. Thus, a water-based emulsion was obtained. Water was added to the water-based emulsion with mixing. Thus, a water-based mold release agent in which the concentration of the organo-modified silicone was 1% by mass was obtained.

Example 9

A water-based mold release agent was obtained in the same manner as that of Example 8, except that the organo-modified silicone of Example 2 was used instead of the organo-modified silicone of Example 1.

Example 10

A water-based mold release agent was obtained in the same manner as that of Example 8, except that the organo-modified silicone of Example 3 was used instead of the organo-modified silicone of Example 1.

Example 11

A water-based mold release agent was obtained in the same manner as that of Example 8, except that the organo-modified silicone of Example 4 was used instead of the organo-modified silicone of Example 1.

Example 12

A water-based mold release agent was obtained in the same manner as that of Example 8, except that the organo-modified silicone of Example 5 was used instead of the organo-modified silicone of Example 1.

Example 13

A water-based mold release agent was obtained in the same manner as that of Example 8, except that the organo-modified silicone of Example 6 was used instead of the organo-modified silicone of Example 1.

Example 14

A water-based mold release agent was obtained in the same manner as that of Example 8, except that the organo-modified silicone of Example 7 was used instead of the organo-modified silicone of Example 1.

Comparative Example 10

A water-based mold release agent was obtained in the same manner as that of Example 8, except that the organo-modified silicone of Comparative Example 1 was used instead of the organo-modified silicone of Example 1.

Comparative Example 11

A water-based mold release agent was obtained in the same manner as that of Example 8, except that the organo-modified silicone of Comparative Example 2 was used instead of the organo-modified silicone of Example 1.

Comparative Example 12

A water-based mold release agent was obtained in the same manner as that of Example 8, except that the organo-modified silicone of Comparative Example 3 was used instead of the organo-modified silicone of Example 1.

Comparative Example 13

A water-based mold release agent was obtained in the same manner as that of Example 8, except that the organo-modified silicone of Comparative Example 4 was used instead of the organo-modified silicone of Example 1.

Comparative Example 14

A water-based mold release agent was obtained in the same manner as that of Example 8, except that the organo-modified silicone of Comparative Example 5 was used instead of the organo-modified silicone of Example 1.

Comparative Example 15

A water-based mold release agent was obtained in the same manner as that of Example 8, except that the organo-modified silicone of Comparative Example 6 was used instead of the organo-modified silicone of Example 1.

Comparative Example 16

A water-based mold release agent was obtained in the same manner as that of Example 8, except that the organo-modified silicone of Comparative Example 7 was used instead of the organo-modified silicone of Example 1.

Comparative Example 17

A water-based mold release agent was obtained in the same manner as that of Example 8, except that the organo-modified silicone of Comparative Example 8 was used instead of the organo-modified silicone of Example 1.

Comparative Example 18

A water-based mold release agent was obtained in the same manner as that of Example 8, except that the organo-modified silicone of Comparative Example 9 was used instead of the organo-modified silicone of Example 1.

Example 15

An oil-based mold release agent was obtained by mixing the organo-modified silicone of Example 1 with toluene, so that the concentration of the organo-modified silicone was 0.5% by mass.

Example 16

An oil-based mold release agent was obtained in the same manner as that of Example 15, except that the organo-modified silicone of Example 2 was used instead of the organo-modified silicone of Example 1.

Example 17

An oil-based mold release agent was obtained in the same manner as that of Example 15, except that the organo-modified silicone of Example 3 was used instead of the organo-modified silicone of Example 1.

Example 18

An oil-based mold release agent was obtained in the same manner as that of Example 15, except that the organo-modified silicone of Example 4 was used instead of the organo-modified silicone of Example 1.

Example 19

An oil-based mold release agent was obtained in the same manner as that of Example 15, except that the organo-modified silicone of Example 5 was used instead of the organo-modified silicone of Example 1.

Example 20

An oil-based mold release agent was obtained in the same manner as that of Example 15, except that the organo-modified silicone of Example 6 was used instead of the organo-modified silicone of Example 1.

Example 21

An oil-based mold release agent was obtained in the same manner as that of Example 15, except that the organo-modified silicone of Example 7 was used instead of the organo-modified silicone of Example 1.

Comparative Example 19

An oil-based mold release agent was obtained in the same manner as that of Example 15, except that the organo-modified silicone of Comparative Example 1 was used instead of the organo-modified silicone of Example 1.

Comparative Example 20

An oil-based mold release agent was obtained in the same manner as that of Example 15, except that the organo-modified silicone of Comparative Example 2 was used instead of the organo-modified silicone of Example 1.

Comparative Example 21

An oil-based mold release agent was obtained in the same manner as that of Example 15, except that the organo-modified silicone of Comparative Example 3 was used instead of the organo-modified silicone of Example 1.

Comparative Example 22

An oil-based mold release agent was obtained in the same manner as that of Example 15, except that the organo-modified silicone of Comparative Example 4 was used instead of the organo-modified silicone of Example 1.

Comparative Example 23

An oil-based mold release agent was obtained in the same manner as that of Example 15, except that the organo-modified silicone of Comparative Example 5 was used instead of the organo-modified silicone of Example 1.

Comparative Example 24

An oil-based mold release agent was obtained in the same manner as that of Example 15, except that the organo-modified silicone of Comparative Example 6 was used instead of the organo-modified silicone of Example 1.

Comparative Example 25

An oil-based mold release agent was obtained in the same manner as that of Example 15, except that the organo-modified silicone of Comparative Example 7 was used instead of the organo-modified silicone of Example 1.

Comparative Example 26

An oil-based mold release agent was obtained in the same manner as that of Example 15, except that the organo-modi-fied silicone of Comparative Example 8 was used instead of the organo-modified silicone of Example 1.

Comparative Example 27

An oil-based mold release agent was obtained in the same manner as that of Example 15, except that the organo-modified silicone of Comparative Example 9 was used instead of the organo-modified silicone of Example 1.

Example 22

A water-based mold release agent was obtained in the same manner as that of Example 8, except that the concentration of the organo-modified silicone in the obtained water-based mold release agent was changed to 0.2% by mass.

Example 23

A water-based mold release agent was obtained in the same manner as that of Example 22, except that the organo-modified silicone of Example 2 was used instead of the organo-modified silicone of Example 1.

Example 24

A water-based mold release agent was obtained in the same manner as that of Example 22, except that the organo-modified silicone of Example 3 was used instead of the organo-modified silicone of Example 1.

Example 25

A water-based mold release agent was obtained in the same manner as that of Example 22, except that the organo-modified silicone of Example 4 was used instead of the organo-modified silicone of Example 1.

Example 26

A water-based mold release agent was obtained in the same manner as that of Example 22, except that the organo-modified silicone of Example 5 was used instead of the organo-modified silicone of Example 1.

Example 27

A water-based mold release agent was obtained in the same manner as that of Example 22, except that the organo-modified silicone of Example 6 was used instead of the organo-modified silicone of Example 1.

Example 28

A water-based mold release agent was obtained in the same manner as that of Example 22, except that the organo-modified silicone of Example 7 was used instead of the organo-modified silicone of Example 1.

Comparative Example 28

A water-based mold release agent was obtained in the same manner as that of Example 22, except that the organo-modified silicone of Comparative Example 1 was used instead of the organo-modified silicone of Example 1.

Comparative Example 29

A water-based mold release agent was obtained in the same manner as that of Example 22, except that the organo-modified silicone of Comparative Example 2 was used instead of the organo-modified silicone of Example 1.

Comparative Example 30

A water-based mold release agent was obtained in the same manner as that of Example 22, except that the organo-modified silicone of Comparative Example 3 was used instead of the organo-modified silicone of Example 1.

Comparative Example 31

A water-based mold release agent was obtained in the same manner as that of Example 22, except that the organo-modified silicone of Comparative Example 4 was used instead of the organo-modified silicone of Example 1.

Comparative Example 32

A water-based mold release agent was obtained in the same manner as that of Example 22, except that the organo-modified silicone of Comparative Example 5 was used instead of the organo-modified silicone of Example 1.

Comparative Example 33

A water-based mold release agent was obtained in the same manner as that of Example 22, except that the organo-modified silicone of Comparative Example 6 was used instead of the organo-modified silicone of Example 1.

Comparative Example 34

A water-based mold release agent was obtained in the same manner as that of Example 22, except that the organo-modified silicone of Comparative Example 7 was used instead of the organo-modified silicone of Example 1.

Comparative Example 35

A water-based mold release agent was obtained in the same manner as that of Example 22, except that the organo-modified silicone of Comparative Example 8 was used instead of the organo-modified silicone of Example 1.

Comparative Example 36

A water-based mold release agent was obtained in the same manner as that of Example 22, except that the organo-modified silicone of Comparative Example 9 was used instead of the organo-modified silicone of Example 1.

3. Performance Evaluation of Mold Release Agents for Mold Casting (1) Lubricity (Mold Releasability) Evaluation Based on Frictional Coefficient By use of the mold release agents for mold casting of Examples 8 to 21 and Comparative Examples 10 to 27, a ring compression test was conducted by the following method. On the basis of the obtained frictional coefficients, the lubricity of the mold release agents for mold casting was evaluated. A smaller frictional coefficient indicates a better lubricity. When the frictional coefficient is 0.20 or more, troubles such as welding of aluminum or the like, galling, and the like may occur during mold casting.

<Ring Compression Test>

First, 10 mL of a mold release agent for mold casting was spray applied (pressure: 0.4 MPa) onto one surface of each of two steel disks (diameter: 120 mm, thickness: 60 mm, material: SKD61 (quenched and tempered)) heated to 200° C. Then, the steel disks were heated for two minutes on a hot plate of 400° C. Subsequently, an aluminum ring test piece (outer diameter: 54 mm, inner diameter: 27 mm, thickness: 18 mm, material: A5052) heated to 500° C. in an electric furnace was sandwiched between the two steel disks, with the surfaces on which the mold release agent was applied being on the sides in contact with the aluminum ring test piece. Then, the stack was compressed with a 100-t hydraulic press (Komatsu Industries Corp., HAF100) at a compression ratio of 50%. The inner diameter of the compressed aluminum ring test piece was measured, and the ratio of change in the inner diameter was calculated by the following formula:

ratio of change in inner diameter=inner diameter after compression/inner diameter before compression Then, the frictional coefficient was determined form the ratio of change in the inner diameter on the basis of a graph for determining a frictional coefficient ("Energy Method by Kudo", Proc. 5th Japan Nat. Congr. Appl. Mech., page 75, 1955). Table 4 shows the obtained values of the frictional coefficient.

(2) Evaluation of Adhesion State

By use of the mold release agents for mold casting of Examples 22 to 28 and Comparative Examples 28 to 36, adhesion areas were measured by the following method, and adhesion states were evaluated. A larger outer diameter of the adhesion area indicates that the mold release agent for mold casting can be applied onto a wider area.

<Measurement of Adhesion Area>

First, an iron plate (length: 120 mm, width: 120 mm, thickness: 1.6 mm, material: SPCC-SB) heated to 200° C. was laid, and 4 g of the mold release agent for mold casting was spray applied (pressure: 0.4 MPa) onto the iron plate from a distance of 15 cm in the height direction. Subsequently, the outer diameter (mm) of the mold release agent adhered to the iron plate was measured with a caliper. Table 5 shows the obtained results.

(3) Lubricity (Mold Releasability) Evaluation Based on Frictional Force (Tensile Resistance)

By use of the mold release agents for mold casting of Examples 23 and 24 and Comparative Examples 28, 30, and 32, frictional forces (tensile resistances) were measured in the following method, and the lubricity of the mold release agents for mold casting was evaluated. A smaller frictional force (tensile resistance) indicates a better lubricity. When the frictional force (tensile resistance) is larger than 10 kgf, troubles such as welding of aluminum or the like, galling, and the like may occur during mold casting.

<Measurement of Frictional Force (Tensile Resistance)>

First, a friction test stage (length: 200 mm, width: 200 mm, thickness: 30 mm, material: SKD-61, having a built-in thermocouple), which was an accessory of an automatic tension tester (manufactured by Mec international Co. Ltd., trade name: Lub tester U), was detached from the automatic tension tester, and heated to 300° C. with a commercially available heater. Subsequently, the friction test bench was stood upright, and the mold release agent for mold casting was spray applied onto the friction test bench under conditions of an air pressure of 0.4 MPa, a liquid pressure meter of 0.3 MPa, and 100 cc in 5 seconds. Immediately thereafter, the friction test bench was placed on the automatic tension tester horizontally, a cylinder (manufactured by Mec international Co. Ltd., inner diameter: 75 mm, outer diameter: 100 mm, height: 50 mm, material: S45C) was placed on the center of the friction test bench, and 90 cc (approximately 240 g) of molten aluminum (ADC-12, temperature: 650° C.) was poured into the cylinder, and solidified by cooling for 45 seconds. Immediately after the solidification, an iron weight (9 kg) was placed gently on the cylinder, and the cylinder was pulled with a gear of the automatic tension tester. Thus, the frictional force (tensile resistance) (kgf) was measured. Table 6 shows the obtained results.

TABLE 1

| Raw material composition of organo-modified silicone | | Example 1 | Example 2 | Example 3 | Example 4 | Example 5 | Example 6 | Example 7 |
|---|---|---|---|---|---|---|---|---|
| Methylhydrogen-siloxane | (g) | 63 | 63 | 63 | 63 | 63 | 63 | 142 |
| | (mol) | 0.02 | 0.02 | 0.02 | 0.02 | 0.02 | 0.02 | 0.046 |
| α-Methylstyrene | (g) | 59 | 59 | 59 | 59 | 59 | 59 | 59 |
| | (mol) | 0.5 | 0.5 | 0.5 | 0.5 | 0.5 | 0.5 | 0.5 |
| 1-Dodecene | (g) | 89 | 89 | 89 | 89 | 89 | 89 | 89 |
| | (mol) | 0.53 | 0.53 | 0.53 | 0.53 | 0.53 | 0.53 | 0.53 |
| 1,4-Butanediol diacrylate | (g) | 2 | — | — | — | — | — | — |
| | (mol) | 0.01 | — | — | — | — | — | — |
| 1,6-Hexanediol diacrylate | (g) | — | 2.3 | 1.1 | 0.6 | — | — | 1.1 |
| | (mol) | — | 0.01 | 0.005 | 0.0027 | — | — | 0.005 |
| 1,9-Nonanediol diacrylate | (g) | — | — | — | — | 1.3 | — | — |
| | (mol) | — | — | — | — | 0.005 | — | — |
| Tetraethylene glycol diacrylate | (g) | — | — | — | — | — | 1.5 | — |
| | (mol) | — | — | — | — | — | 0.005 | — |
| Yield | (g) | 190 | 192 | 190 | 191 | 190 | 192 | 276 |
| Viscosity | (mPa·s) | 38000 | 9450 | 4160 | 2880 | 3540 | 2930 | 2080 |

TABLE 2

| Raw material composition of organo-modified silicone | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Methylhydrogen siloxane | (g) | 63 | 63 | 63 | 63 | 63 | 63 | — | — | — |
| | (mol) | 0.02 | 0.02 | 0.02 | 0.02 | 0.02 | 0.02 | — | — | — |
| α-Methylstyrene | (g) | 59 | 59 | 59 | 59 | 59 | 59 | — | — | — |
| | (mol) | 0.5 | 0.5 | 0.5 | 0.5 | 0.5 | 0.5 | — | — | — |
| 1-Dodecene | (g) | 89 | 89 | 89 | 89 | 89 | 89 | — | — | — |
| | (mol) | 0.53 | 0.53 | 0.53 | 0.53 | 0.53 | 0.53 | — | — | — |
| 1,5-Hexadiene | (g) | — | 0.8 | — | — | — | — | — | — | — |
| | (mol) | — | 0.01 | — | — | — | — | — | — | — |
| 1,7-Octadiene | (g) | — | — | 1.1 | 0.6 | — | — | — | — | — |
| | (mol) | — | — | 0.01 | 0.0055 | — | — | — | — | — |
| 1,9-Decadiene | (g) | — | — | — | — | 0.7 | — | — | — | — |
| | (mol) | — | — | — | — | 0.005 | — | — | — | — |
| 5-Vinylbicyclo[2,2,1]hept-2-ene | (g) | — | — | — | — | — | 1.2 | — | — | — |
| | (mol) | — | — | — | — | — | 0.01 | — | — | — |
| Dimethylsilicone | (g) | — | — | — | — | — | — | 100 | — | 50 |
| Alkyl- and aralkyl-modified silicone | (g) | — | — | — | — | — | — | — | 100 | 50 |
| Yield | (g) | 190 | 190 | 191 | 191 | 190 | 190 | 100 | 100 | 100 |
| Viscosity | (mPa·s) | 2400 | 3220 | High | 4110 | 7400 | 6400 | 9800 | 1520 | 4940 |

TABLE 3

| Composition of organo-modified silicone | Example 1 | Example 2 | Example 3 | Example 4 | Example 5 | Example 6 | Example 7 |
|---|---|---|---|---|---|---|---|
| $R^1$ | $-CH_3$ | $-CH_3$ | $-CH_3$ | $-CH_3$ | $-CH_3$ | $-CH_3$ | $-CH_3$ |
| $R^4$ | $-C_{12}H_{25}$ | $-C_{12}H_{25}$ | $-C_{12}H_{25}$ | $-C_{12}H_{25}$ | $-C_{12}H_{25}$ | $-C_{12}H_{25}$ | $-C_{12}H_{25}$ |
| $R^5$ | $-CH_2CH(CH_3)C_6H_5$ | $-CH_2CH(CH_3)C_6H_5$ | $-CH_2CH(CH_3)C_6H_5$ | $-CH_2CH(CH_3)C_6H_5$ | $-CH_2CH(CH_3)C_6H_5$ | $-CH_2CH(CH_3)C_6H_5$ | $-CH_2CH(CH_3)C_6H_5$ |
| X | $-(C_2H_4)-COO(C_4H_8)OOC-(C_2H_4)-$ | $-(C_2H_4)-COO(C_6H_{12})OOC-(C_2H_4)-$ | $-(C_2H_4)-COO(C_6H_{12})OOC-(C_2H_4)-$ | $-(C_2H_4)-COO(C_6H_{12})OOC-(C_2H_4)-$ | $-(C_2H_4)-COO(C_9H_{18})OOC-(C_2H_4)-$ | $-(C_2H_4)-COO[(C_2H_4O)_3-C_2H_4]OOC-(C_2H_4)-$ | $-(C_2H_4)-COO(C_6H_{12})OOC-(C_2H_4)-$ |
| a | 0 | 0 | 0 | 0 | 0 | 0 | 22 |
| c | 25 | 25 | 25 | 25 | 25 | 25 | 10 |
| d | 25 | 25 | 25 | 25 | 25 | 25 | 10 |
| e | 1 | 1 | 0.5 | 0.25 | 0.5 | 0.5 | 0.2 |

TABLE 4

| Water-based mold release agent | Frictional coefficient | Oil-based mold release agent | Frictional coefficient |
|---|---|---|---|
| Example 8 | 0.15 | Example 15 | 0.18 |
| Example 9 | 0.14 | Example 16 | 0.16 |
| Example 10 | 0.15 | Example 17 | 0.19 |
| Example 11 | 0.19 | Example 18 | 0.17 |
| Example 12 | 0.15 | Example 19 | 0.19 |
| Example 13 | 0.15 | Example 20 | 0.19 |
| Example 14 | 0.19 | Example 21 | 0.17 |
| Comparative Example 10 | 0.20 | Comparative Example 19 | 0.24 |
| Comparative Example 11 | 0.18 | Comparative Example 20 | 0.22 |
| Comparative Example 12 | 0.21 | Comparative Example 21 | 0.22 |
| Comparative Example 13 | 0.19 | Comparative Example 22 | 0.22 |
| Comparative Example 14 | 0.19 | Comparative Example 23 | 0.22 |
| Comparative Example 15 | 0.24 | Comparative Example 24 | 0.24 |
| Comparative Example 16 | 0.25 | Comparative Example 25 | 0.22 |
| Comparative Example 17 | 0.28 | Comparative Example 26 | 0.22 |
| Comparative Example 18 | 0.22 | Comparative Example 27 | 0.19 |

TABLE 5

| Water-based mold release agent | Outer diameter of mold release agent adhered (mm) |
|---|---|
| Example 22 | 72.9 |
| Example 23 | 74.4 |
| Example 24 | 73.3 |
| Example 25 | 72.6 |
| Example 26 | 73.6 |
| Example 27 | 73.0 |
| Example 28 | 72.8 |
| Comparative Example 28 | 68.5 |
| Comparative Example 29 | 71.2 |
| Comparative Example 30 | 60.9 |
| Comparative Example 31 | 72.3 |
| Comparative Example 32 | 72.4 |
| Comparative Example 33 | 72.1 |
| Comparative Example 34 | 62.5 |
| Comparative Example 35 | 61.0 |
| Comparative Example 36 | 68.8 |

TABLE 6

| Water-based mold release agent | Frictional force (tensile resistance) (Kgf) |
|---|---|
| Example 23 | 6.9 |
| Example 24 | 7.9 |
| Comparative Example 28 | 10.8 |
| Comparative Example 30 | 16.3 |
| Comparative Example 32 | 14.3 |

As is apparent from the results shown in Table 1, it was found that the organo-modified silicones of the present invention obtained in Examples 1 to 7 had sufficiently high viscosities. Moreover, as is apparent from the results shown in Table 4, it was found that, when used as both the water-based mold release agent and the oil-based mold release agent, each of the mold release agents for mold casting of the present invention (Examples 8 to 21) comprising the organo-modified silicones of the present invention obtained in Examples 1 to 7 exhibited such an excellent lubricity (mold releasability) that the frictional coefficients were less than 0.20. On the other hand, regarding the organo-modified silicones obtained in Comparative Examples 1 to 9, it was found that the frictional coefficient of each of the mold release agents for mold casting (Comparative Examples 11, 13, 14, 18, 20, 22, 23, and 27) comprising the organo-modified silicones obtained in Comparative Examples 2, 4, 5, and 9 was 0.20 or more in one of the cases where the mold release agent was used as the water-based mold release agent and the oil-based mold release agent, and the lubricity (mold releasability) was not obtained in both cases of the water-based mold release agent and the oil-based mold release agent. Moreover, it was found that the frictional coefficient of each of the mold release agents for mold casting (Comparative Examples 10, 12, and 15 to 17, 19, 21, and 24 to 26) comprising the organo-modified silicones obtained in Comparative Examples 1, 3, and 6 to 8 was 0.20 or more, and that the organo-modified silicones obtained in Comparative Examples 1, 3, and 6 to 8 are poor lubricity (mold releasability), when used for both the water-based mold release agent and the oil-based mold release agent.

In addition, as is apparent from the results shown in Table 6, it was found that each of the mold release agents for mold casting of the present invention (Examples 23 and 24) exhibited a frictional force (tensile resistance) of 10 kgf or less, and hence had superior lubricity (mold releasability) from a viewpoint other than the frictional coefficient.

Moreover, as is apparent from the results shown in Table 5, each of the water-based mold release agents obtained in Examples 22 to 28 resulted in a larger outer diameter of the mold release agent adhered to the iron plate than each of the water-based mold release agents obtained in Comparative Examples 28 to 36, although the concentrations of the organo-modified silicones in the water-based mold release agents used for the test were the same. Hence, it was found that the mold release agents for mold casting of the present invention was able to be spray applied onto a wider area.

As described above, according to the present invention, it is possible to provide an organo-modified silicone capable of imparting an excellent mold releasability to a mold release agent for mold casting, and a mold release agent for mold casting comprising the organo-modified silicone.

Moreover, the organo-modified silicone of the present invention is stable both in a water-based solvent and in an oil-based solvent. Hence, the organo-modified silicone of the present invention can exhibit excellent mold releasability, when used for both a water-based mold release agent for mold casting and an oil-based mold release agent for mold casting. Moreover, since the organo-modified silicone of the present invention has a high viscosity, the mold release agent for mold casting of the present invention comprising the organo-modified silicone is highly adhesive to molds, and can hold an excellent mold releasability even under high-temperature conditions. In addition, the mold release agent for mold casting of the present invention can be applied onto a wider area than conventional mold release agents by spray application, which is a major method for applying a mold release agent for mold casting. Hence, the amount of the mold release agent for mold casting used can be reduced. Accordingly, the present invention is expected to contribute to improvement in working efficiency of mold casting and quality of formed articles.

What is claimed is:

1. An organo-modified silicone obtained by an addition reaction of (I) a chain silicone represented by the following general formula (1):

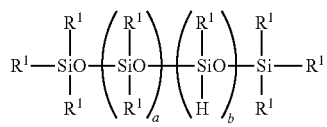

(1)

wherein in the formula (1), $R^1$s each independently represent a hydrocarbon group having 1 to 3 carbon atoms, and a and b are numbers satisfying conditions represented by the following formulae (i) to (iii):

$$0 \leq a \leq 195 \quad \text{(i)}$$

$$5 \leq b \quad \text{(ii)}$$

$$10 \leq a+b \leq 200 \quad \text{(iii), with}$$

(II) at least one hydrocarbon selected from the group consisting of monoolefins having 4 to 18 carbon atoms and aromatic hydrocarbons having an alkenyl group and 8 to 12 carbon atoms, and (III) a di(meth)acrylic acid ester represented by the following general formula (2):

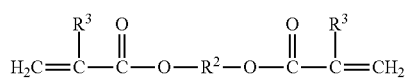

(2)

wherein in the formula (2), $R^2$ represents any one selected from the group consisting of linear chain alkylene groups having 2 to 16 carbon atoms, branched chain alkylene groups having 2 to 16 carbon atoms, and oxyalkylene groups whose number of repetitions of an oxyalkylene having 2 to 4 carbon atoms is 1 to 6, and $R^3$s each independently represent a hydrogen atom or a methyl group, at a molar ratio satisfying a condition represented by the following formula (iv):

{a number of moles of the (I) chain silicone}:{a number of moles of the (II) hydrocarbon}:{a number of moles of the (III) di(meth)acrylic acid ester}=$A$:$B$:$C$   (iv)

wherein in the formula (iv), A represents a number of moles of the (I) chain silicone determined from a number average molecular weight of the (I) chain silicone, and B and C are numbers satisfying conditions represented by the following formulae (v) and (vi):

$$0.05A \leq C \leq A \quad \text{(v)}$$

$$A \times b - 2C = B \quad \text{(vi)}$$

wherein in the formula (vi), b has the same meaning as that of b in the formula (1) in the presence of a hydrosilylation catalyst.

2. The organo-modified silicone according to claim 1, which is represented by the following general formula (3):

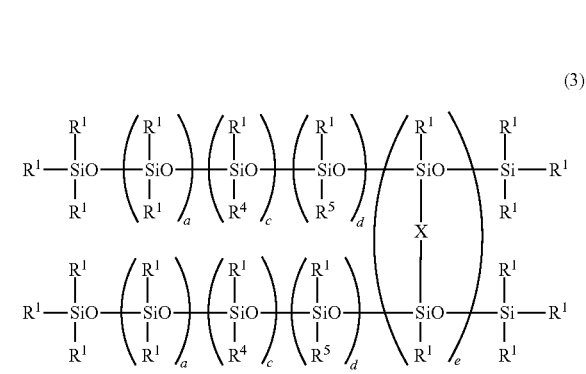

(3)

wherein the formula (3), $R^1$s each independently represent a hydrocarbon group having 1 to 3 carbon atoms, $R^4$s each independently represent a hydrocarbon group having 4 to 18 carbon atoms, $R^5$s each independently represent an aralkyl group having 8 to 12 carbon atoms, Xs each independently represent a diester structure represented by the following general formula (4):

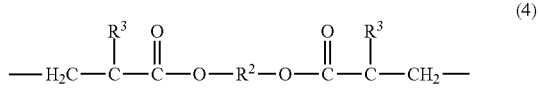

(4)

wherein the formula (4), $R^2$ represents any one selected from the group consisting of linear chain alkylene groups having 2 to 16 carbon atoms, branched chain alkylene groups having 2 to 16 carbon atoms, and oxyalkylene groups whose number of repetitions of an oxyalkylene having 2 to 4 carbon atoms is 1 to 6, and $R^3$s each independently represent a hydrogen atom or a methyl group, and a, c, d, and e are each independently a number satisfying conditions represented by the following formulae (i), and (vii) to (xi):

$$0 \leq a \leq 195 \quad \text{(i)}$$

$$0 \leq c \leq 199.9 \quad \text{(vii)}$$

$$0 \leq d \leq 199.9 \quad \text{(viii)}$$

$$0.1 \leq e \leq 2 \quad \text{(ix)}$$

$$5 \leq c+d+e \quad \text{(x)}$$

$$10 \leq a+c+d+e \leq 200 \quad \text{(xi).}$$

3. A mold release agent for mold casting, comprising the organo-modified silicone according to claim 1.

4. The mold release agent for mold casting according to claim 3, which further comprises a surfactant and water and is a water-based mold release agent for mold casting.

5. The mold release agent for mold casting according to claim 3, which further comprises a liquid organic compound and is an oil-based mold release agent for mold casting.

6. A mold casting method comprising applying the mold release agent according to claim 3 to a mold and then casting a metal formed article.

7. A mold release agent for mold casting, comprising the organo-modified silicone according to claim 2.

8. The mold release agent for mold casting according to claim 7, which further comprises a surfactant and water and is a water-based mold release agent for mold casting.

9. The mold release agent for mold casting according to claim 7, which further comprises a liquid organic compound and is an oil-based mold release agent for mold casting.

10. A mold casting method comprising applying the mold release agent according to claim 7 to a mold and then casting a metal formed article.

* * * * *